United States Patent [19]
Kobayashi et al.

[11] Patent Number: 5,475,706
[45] Date of Patent: Dec. 12, 1995

[54] BULK DATA TRANSMISSION SYSTEM

[75] Inventors: Yoshikazu Kobayashi, Tokyo; Hirofumi Ohyama, Shizuoka, both of Japan

[73] Assignee: NEC Corporation, Tokyo, Japan

[21] Appl. No.: 31,942

[22] Filed: Mar. 16, 1993

[30] Foreign Application Priority Data

Mar. 16, 1992 [JP] Japan .................................... 4-058240

[51] Int. Cl.⁶ .................................. H04L 5/20; H04L 7/00
[52] U.S. Cl. ........................ 375/260; 375/354; 370/94.2; 370/105.2
[58] Field of Search ........................ 375/7–8, 10, 37–38, 375/106, 112, 121; 370/94.1, 94.2, 100.1, 105.1, 105.2, 108, 110.1; 455/73; 379/93

[56] References Cited

U.S. PATENT DOCUMENTS

| | | | |
|---|---|---|---|
| 4,727,536 | 2/1988 | Reeves et al. | 370/84 |
| 4,953,180 | 8/1990 | Fieschi et al. | 375/7 |
| 5,293,378 | 3/1994 | Shimizu | 370/94.1 |

*Primary Examiner*—Young Tse
*Attorney, Agent, or Firm*—Sughrue, Mion, Zinn, Macpeak & Seas

[57] ABSTRACT

A transmitting/receiving station having a section comprising a cellulating buffer for dividing input data into cell data of a plurality of channels on the basis of a cell having a predetermined bit length. Before the transmission of the cell data, a signal outputting section sends a synchronizing signal including particular channel identification data to each of the channels. As a receiving section of a receiving station receives the synchronizing signals, a signal detector distinguishes the channels while detecting the times when the channels were received. Then, the receiving section is initialized such that a replacing section transfers cell data other than those of a channel arrived last to a time gap buffer, and the time gap buffer corrects a difference between the reception timings of cell data. Thereafter, as the transmitting station sends the cell data of the plurality of channels at the same time, the receiving station reproduces the original input data by correcting the time gap between the channels and then serializing the cell data in a correct order.

5 Claims, 3 Drawing Sheets

BULK DATA TRANSMISSION SYSTEM

BACKGROUND OF THE INVENTION

1. Field of the Invention

The present invention relates to a bulk data transmission system and, more particularly, to a bulk data transmission system for allowing data terminals to interchange a great amount of serial data by distributing them to a plurality of communication paths.

2. Description of the Prior Art

A conventional bulk data transmission system of the type described uses packets. For example, a basic interface prescribed by CCITT Recommendations, I Series is capable of transmitting two B channels (64 kbps) and a single D channel (16 kbps) at a symbol rate of 192 kbps. Assume that a data terminal capable of transmitting data at a rate of 128 kbps sends data via such a basic interface. Then, it is necessary to transform 128 kbps data to be transmitted to two parallel data sequences each having a rate of 64 kbps and send each data sequence over respective one of the two B channels (B1 and B2). Generally, since the two B channels are each routed through a different communication path, a time gap occurs between the B channels. In addition, the receiving station cannot determine which of the two parallel data sequences corresponds to the channel B1 (or B2) of the transmitting section. Therefore, when the two parallel data sequences are simply transmitted over the two B channels at the same time, the original 128 kbps data cannot be reproduced at the receiving station. By contrast, when the data are transmitted in packets, the receiving station can reproduce the original data by referencing packet numbers included in headers each being added to a particular packet.

However, a problem with the conventional packet type bulk data transmission system is that since the maximum packet length is limited, it is necessary to assemble and then disassemble a great number of packets at the cost of time. This is especially true when a great amount of data is transmitted. Moreover, the headers added to the individual packets degrade the efficient use of bits by data to be transmitted.

BRIEF SUMMARY OF THE INVENTION

OBJECT OF THE INVENTION

It is, therefore, an object of the present invention to provide a bulk data transmission system which allows serial data to be divided into a plurality of channels and then sent to the same addressee without being accompanied by headers or similar extra information.

SUMMARY OF THE INVENTION

In accordance with the present invention, in a bulk data transmission system comprising a transmitting section and a receiving section, the transmitting section comprises a cellulating means for dividing serial input data into cell data of a plurality of channels on the basis of a cell having a predetermined bit length, a signal transmitting means for transmitting synchronizing signals each including channel identification data identifying respective one of the plurality of channels in parallel before transmitting the input data, and a first interface means connected to transmission paths for transmitting the plurality of channels for transmitting the synchronizing signals and cell data in a bulk. The receiving section comprises a second interface means for receiving the synchronizing signals and cell data from the transmission paths, a signal detecting means for generating, on receiving each of the synchronizing signals associated with the plurality of channels, a reception timing signal indicative of a reception timing, and detecting the channel identification data, at least one time gap correcting means for correcting, on receiving the reception timing signals, a difference in reception timing of the cell data of the channel other than the channel arrived last from the cell data of the channel arrived last, a replacing means for connecting the cell data received on the channel other than the channel arrived last to one of the at least one time gap correcting means corresponding to the reception timing of the cell data, and an assembling and sending means for converting the cell data passed through the time gap correcting means and the cell data on the channel arrived last to serial data in an order matching the channel identification data on the basis of the cell having a predetermined bit length, thereby reproducing the input data.

BRIEF DESCRIPTION OF THE DRAWINGS

The above-mentioned and other objects, features and advantages of the present invention will become more apparent by reference to the following detailed description of the invention taken in conjunction with the accompanying drawing, wherein:

FIGS. 3, 3A and 3B are flowcharts demonstrating a specific communication procedure to be executed by the embodiment.

DETAILED DESCRIPTION OF THE PREFERRED EMBODIMENT

Figure 1:
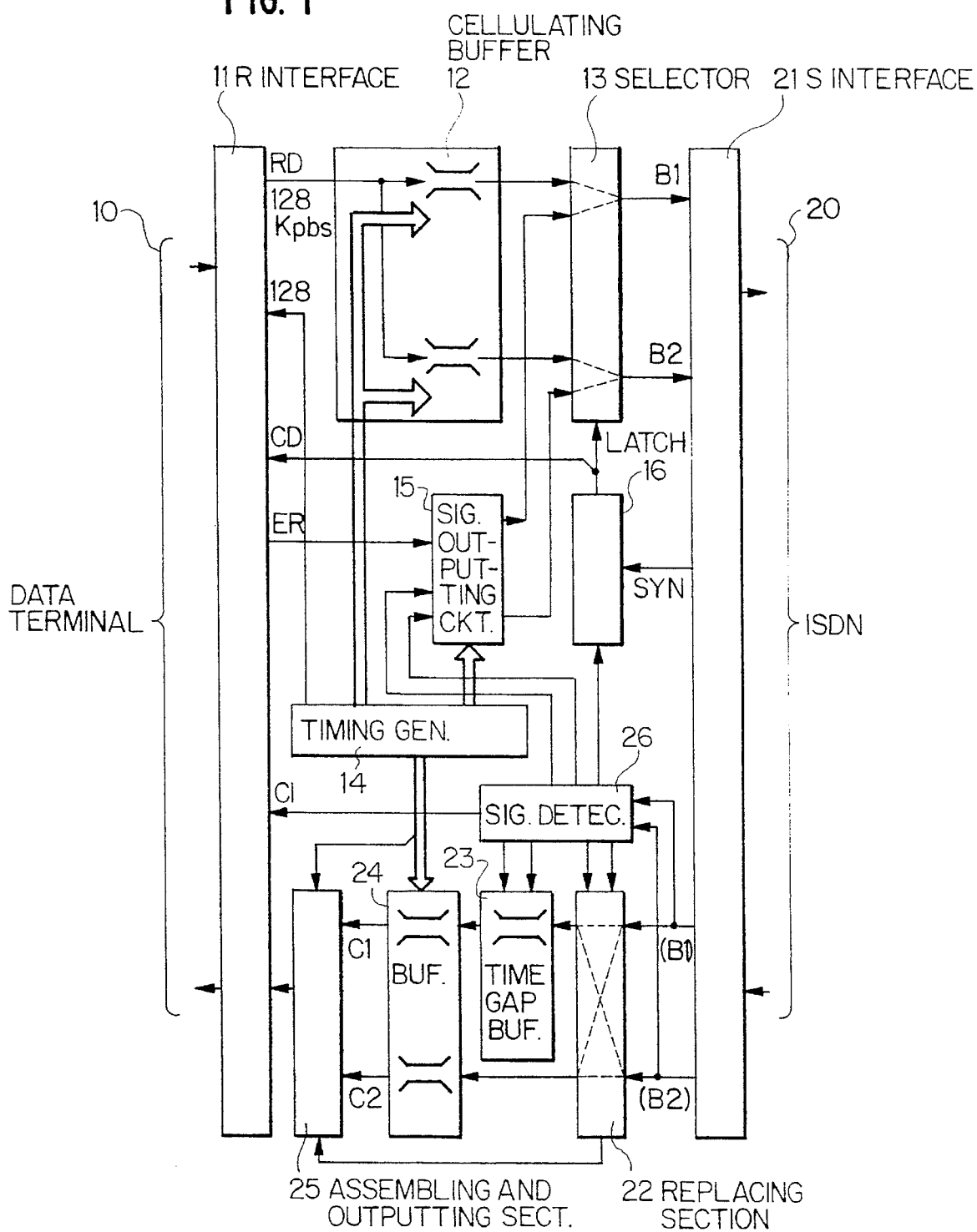
FIG. 1 is a block diagram schematically showing a bulk data transmission system embodying the present invention.

Referring to FIG. 1 of the drawings, a bulk data transmission system embodying the present invention includes an R interface 11 and an S interface 21 which are each implemented as the basic interface prescribed by CCITT Recommendations, I Series. Interposed between the R interface 11 and the S interface 21 are a transmission circuit made up of a cellulating buffer 12 for converting data to cells, a selector 13, and a reception circuit made up of a replacing section 22, a time gap buffer 23, a buffer 24 and an assembling and outputting section 25. Also connected between the interfaces 11 and 21 are a timing generator 14, a signal outputting circuit 15, a latch 16 and a signal detector 26 which cooperate to control the operations of the transmission and reception circuits.

The R interface 11 and S interface 21 each functions in the same manner as a basic interface included in the conventional system. Specifically, the R interface 11 interchanges with a data terminal 10 serial data having a rate corresponding to two B channels (64 kbps each), i.e., 128 kbps, and control data for a communication procedure.

In the event of the transmission of serial data (128 kbps), from a transmitting station to a receiving station, each of which having the same circuitry of the transmission system as shown in FIG. 1, the cellulating buffer 12 included in the transmission circuit of the transmitting station divides 128 kbps data RD from the R interface 11 into cells each having a predetermined number of bits (1 octet, i.e., 8 bits in the embodiment) in response to a timing signal fed from the timing generator 14. The cells are alternately written to two memory areas provided in the buffer 12 and assigned to a B1 and a B2 channels; respectively. The selector 13 selects signals (64 kbps each) read out of the two memory areas of the buffer 12 and transfers them to the S interface 21 as a B1 channel signal and a B2 channel signal. The S interface 21 multiplexes the B1 and B2 channel signals and a signal on a channel D (16 kpbs) (a channel D signal path is not shown) in a predetermined format on a time division basis, thereby forming a frame (192 kbps). The frame is sent from the S interface 21 to an ISDN (Integrated Services Digital Network) 20 and then received by the receiving station.

As the receiving station receives the signal having the frame format over the ISDN 20, the S interface 21 demultiplexes it to separate a (B1) channel signal, a (B2) channel signal, and a D channel signal. Generally, to which of the (B1) and (B2) channels the B1 and B2 channel signals included in the signal having the frame format will be connected at the receiving station is not certain since different communication routes are selected in the ISDN 20. Moreover, a time gap ascribable to the difference of communication routes occurs. At the receiving station, the signal detector 26 determines whether or not the B1 and B2 channels have been replaced with each other and detects a time gap between the two channels, and then produces control signals matching the result of decision. In response, the replacing section 22 feeds one of the two channels arrived first to the time gap buffer 23 so as to correct the time gap, i.e., bring the two channels into coincidence with respect to timing. Subsequently, signals C1 and C2 of the two channels written to respective memories in the buffer 24 are read out and transferred to the assembling and outputting section 25. The timing generator 14 delivers a timing command to the assembling and outputting section 25 while the replacing section 22 delivers information representative of the replacement condition of the two channels to the section 25. In response, the assembling and outputting section 25 multiplexes the signals C1 and C2 alternately on a time division basis 1 octet at a time and in the same order as the cell division executed at the receiving station. As a result, 128 kbps data RD identical with the data RD at the receiving station are reproduced and sent to the data terminal 10 via the R interface 11.

As stated above, the receiving station has to determine whether or not the B1 and B2 channels have been replaced with each other and to detect a time gap between the two channels. In the illustrative embodiment, as communication paths are set up between the transmitting and receiving stations by the transmission from the transmitting station, the transmitting station sends a particular synchronizing signal for initialization to each of the channels immediately before the above-stated transmission of data. On receiving the synchronizing signals, the receiving station determines the replacement condition of the two channels and a time gap. This will be described specifically hereinafter.

Figure 2:
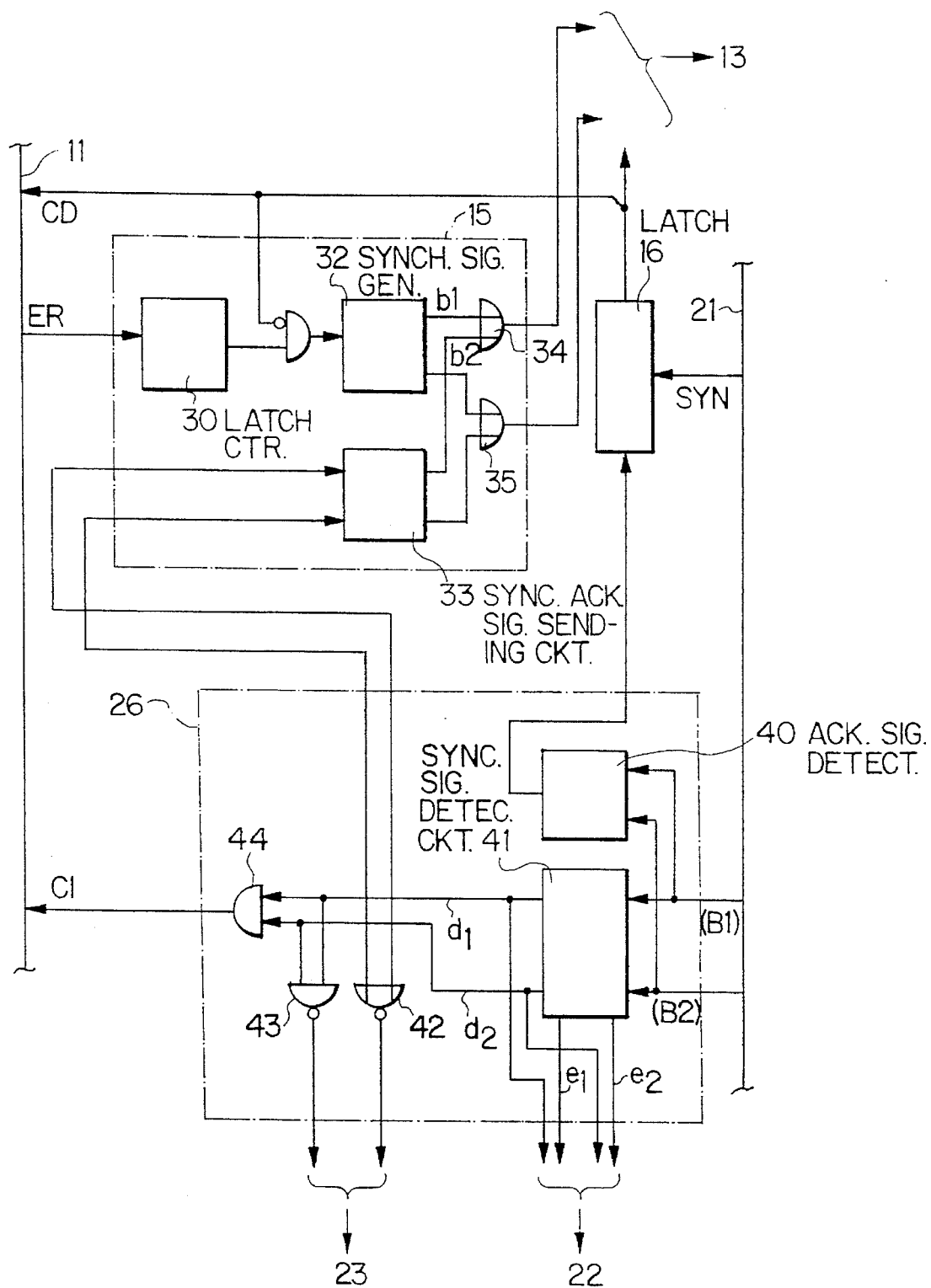
FIG. 2 is a block diagram schematically showing a signal transmitting section and a signal detecting section included in the embodiment.

As shown in FIG. 2, the signal outputting section 15, FIG. 1, has a latch counter 30 for generating, immediately after transmission paths have been set up, a pulse signal indicative of a time for generating the synchronizing signals in response to a transmission request signal ER fed thereto from the R interface 11. An inhibit gate 31 inhibits the transfer of the timing signal in response to a transmission permit signal CD appearing when the synchronization for initialization is confirmed. A synchronizing signal generating circuit 32 generates the synchronizing signals for the channels B1 and B2 on receiving the timing signal from the inhibit gate 31. A synchronization acknowledge signal sending circuit 33 generates and returns a synchronization acknowledge signal to the transmitting station on confirming the synchronizing signals for initialization received over the channels (B1) and (B2). OR gates 34 and 35 gate the output signals of the circuits 32 and 33 and transfer them to the input terminal of the selector 13.

As also shown in FIG. 2, the signal detector 26 has a synchronization acknowledge signal detecting circuit 40 for detecting the synchronizing signals returned from the receiving station over the channels (B1) and (B2) and, if they are synchronous, generating a pulse and feeding it to the latch 16. A synchronizing signal detecting circuit 41 generates, on receiving the synchronizing signals over the two channels (B1) and (B2), two pulses d1 and d2 each going high on the reception of respective one of the synchronizing signals. At the same time, this circuit 41 generates data e1 and e2 representative of the channel numbers included in the synchronizing signals. A NOR gate 42 and a NAND gate 43 produce pulses for controlling the read timing of the time gap buffer 23. An AND gate 44 sends a reception indication signal CI to a terminal (10) associated with the receiving station when the synchronization of the two channels is confirmed.

Figures 3A, 3B:
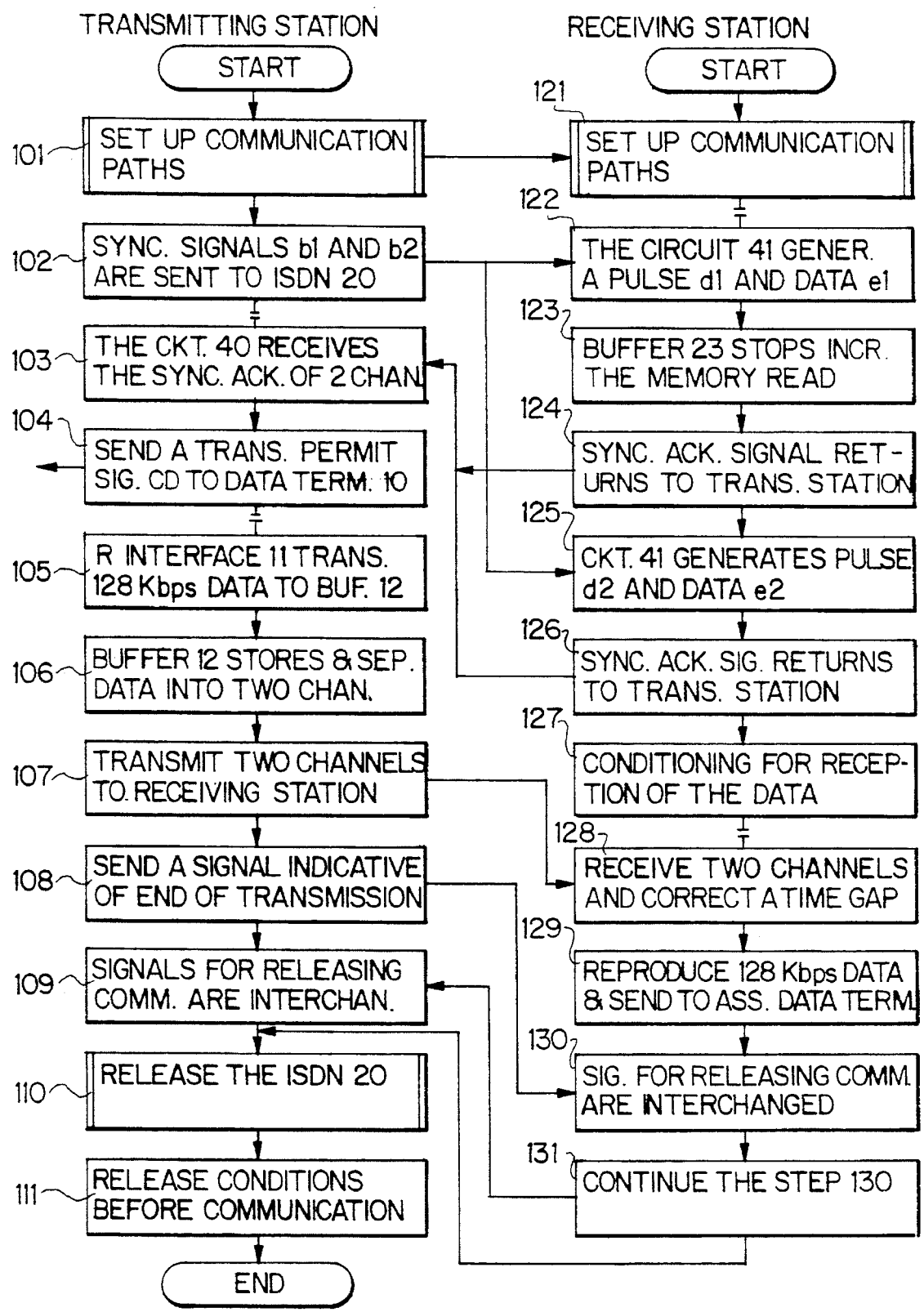

A reference will be made to FIG. 3A for describing a communication procedure between the transmitting and receiving stations each having the circuitry shown in FIG. 2.

On receiving a bulk data transmission request from the data terminal 10, the transmitting station with the construction of FIG. 1 interchanges signals for setting up communication paths with the data terminal (10) associated with the receiving station over the ISDN 20 by using the D channel, as in the conventional system. As a result, communication paths are set up over the B1 and B2 channels (steps 101 and 121).

On receiving an answer indicating that transmission paths have been set up, the data terminal 10 on the transmitting side sends a transmit request signal ER. As the latch counter 30 receives the request signal ER via the R interface 11, it counts the pulses of a clock signal and, every time it counts a predetermined number of pulses, generates a pulse indicative of a time for generating the synchronizing signal a predetermined number of times. While the synchronizing signals are not confirmed by the receiving station, the pulse of the transmission permit signal CD does not appear. Hence, the above-mentioned timing pulse is transferred to the synchronizing signal generating circuit 32 via the inhibit gate 31. In response, the circuit 32 generates at the same time synchronizing signals b1 and b2 by adding respective channel identification data to synchronization data having a predetermined pattern. The synchronizing signals b1 and b2 are fed to the selector 13 via the OR gates 34 and 35. While the pulses of the transmit permit signal CD do not appear, the selector 13 selects the output signals of the signal outputting section 15 and transfers them to the S interface 21. Specifically, the synchronizing signals b1 and b2 are transferred from the selector 13 to the S interface 21 at the same timing as a B1 channel signal and a B2 channel signal, respectively. The S interface 21 arranges the synchronizing signals b1 and b2 in a frame and then sends them to the ISDN 20 (step 102).

At the receiving station, the S interface 21 separates the framed signal into two channels (B1) and (B2) and delivers them to the synchronizing signal detecting circuit 41. In response, the circuit 41 generates pulses d1 and d2 representative of the times when the synchronizing signals were received on the respective channels, and data e1 and e2 representative of the results of channel identification (steps 122 and 125). For example, when the synchronizing signal on the channel (B1) arrives first, the pulse d1 goes high first with the result that the output pulse of the NOR gate 42 goes low. Consequently, the time gap buffer 23 stops incrementing the memory read address thereof and prepares for storage (step 123). The synchronization acknowledge signal outputting circuit 33 generates a synchronization acknowledge signal at the positive-going edge of the pulse d1 and returns it to the transmitting station to inform it of the reception of the synchronizing signal of the channel arrived first (step 124).

When the synchronizing signal on the channel (B2) arrives after the signal on the channel (B1), the pulse d2 also goes high to cause the output pulse of the NAND gate 43 to go low. As a result, the time gap buffer 23 again starts incrementing the memory read address thereof while the output pulse of the AND gate 44 goes high. Then, a reception indication signal CI is sent to the data terminal 10 associated with the receiving station via the R interface 11, thereby conditioning it for the reception of data (step 127). Further, the synchronization acknowledge signal outputting circuit 33 generates a synchronization acknowledge signal at the positive-going edge of the pulse d2 and returns it to the transmitting station (step 126).

By the above procedure, the increment of the memory address in the time gap buffer 23 is delayed by an amount matching the time gap between the channel (B1) arrived first and the channel (B2) arrived last. Consequently, data are read out with the time gap thereof corrected.

At the transmitting station, when the synchronizing signal detecting circuit 40 receives the synchronization acknowledge signals of the two channels (step 103), it feeds a pulse to the latch 16. On the other hand, the S interface 21 delivers to the latch 16 a pulse SYN indicating that the frame synchronization of the signals received from the ISDN 20 has been set up. On receiving these signals, the latch 16 generates a pulse sends it to the data terminal associated with the transmitting station via the R interface 11 as a transmission permit signal CD (step 104). At the same time, the latch 16 causes the selector 13 to select the cellulating buffer 12 in place of the signal outputting section 15.

On receiving the transmission permit signal CD, the data terminal 10 at the transmitting side starts sending data in a bulk. The R interface 11 receives the data (128 kbps) and transfers them to the cellulating buffer 12 (step 105). The buffer 12 stores the data in the form of cells while separating them into two channels (step 106), as stated earlier with reference to FIG. 1 and FIG. 3B. The two channels are read out of the buffer 12 in the same phase and transmitted to the receiving station (step 107). As the receiving station receives the cell data of the two channels, it stores them after correcting the time gap (step 128), produces cells in the same order as at the transmitting station to thereby reproduce the 128 kbps serial data, and then sends them to the associated data terminal 10 via the R interface 11 (step 129).

When the transmitting station sends a signal indicative of the end of transmission (step 108), signals for releasing the communication paths are interchanged over the D channel in the same procedure as in the conventional system (steps 109, 130 and 131). As a result, the ISDN 20 is released (step 110), and the conditions existing before the communication are restored (step 111).

As stated above, after the communication paths have been set up, the transmitting section of the transmitting station sends synchronizing signals for initialization to the two channels B1 and B2 before sending data. This allows the receiving section of the receiving station to correct a time gap between the B1 and B2 channels and initialize the assembling order for serialization. Subsequently, serial data are sent from the transmitting station to the receiving station over the two channels B1 and B2 at the same time. Then, the receiving station can reproduce the original serial data by assembling the data received over the channels B1 and B2. It is noteworthy that the transmitting station does not have to add headers or similar conventional extra data to the serial data to send and that the time gap buffer 23 or the like necessitate small capacity because it is unnecessary to store the headers or the like.

While the embodiment has been shown and described in relation to the basic interface prescribed by CCITT Recommendations, I series, it is, of course, practicable with any other channel type system.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is, therefore, contemplated that the appended claims will cover any modifications or embodiments as fall within the true scope of the invention.

The invention claimed is:

1. In a bulk data transmission system having at least one transmitting and one receiving stations, each of station being capable of transmission and reception and each of the stations comprising a transmitting section and a receiving section, said transmitting section comprising:

a cellulating means for dividing serial input data into cell data of a plurality of channels on the basis of a cell having a predetermined bit length;

a signal transmitting means for transmitting synchronizing signals each including channel identification data identifying respective one of said plurality of channels in parallel before transmitting the input data; and a first interface means connected to transmission paths for transmitting said plurality of channels for transmitting said synchronizing signals and said cell data in a bulk;

said receiving section comprising:

a second interface means for receiving said synchronizing signals and said cell data from said transmission paths;

a signal detecting means for generating, on receiving each of said synchronizing signals associated with said plurality of channels, a reception timing signal indicative of a reception timing, and detecting said channel identification data;

at least one time gap correcting means for correcting, on receiving said reception timing signal, a difference in reception timing of the cell data of the channel other than the channel arrived last from the cell data of said channel arrived last;

a replacing means for connecting the cell data received on said channel other than said channel arrived last to one of said at least one time gap correcting means corresponding to the reception timing of said cell data; and an assembling and sending means for converting said cell data passed through said at least one time gap correcting means and said cell data on said channel arrived last to serial data in an order matching said channel identification data on the basis of the cell having the predetermined bit length, thereby reproducing said input data.

2. The system as claimed in claim 1, wherein said receiving section further comprises a synchronization acknowledge signal outputting means for returning, every time said receiving section receives said synchronizing signal transmitted by said signal transmitting means of said at least one transmitting station to identify each of said plurality of channels, a synchronization acknowledge signal indicating that said receiving section has received said synchronizing signal to said at least one transmitting station.

3. The system as claimed in claim 2, wherein said transmitting section further comprises a selecting means for selecting, until said receiving section of said at least one receiving station returns the synchronization acknowledge signals of all of said plurality of channels, said synchronizing signals to cause said synchronizing signals to be sent or selecting, after said receiving section has returned said synchronization acknowledge signals, said cell data to cause said cell data to be transmitted.

4. The system as claimed in claim 1, wherein said cellulating means comprises a buffer memory having areas each being allocated to respective one of said plurality of channels.

5. The system as claimed in claim 1, wherein said at least one time gap correcting means comprises a buffer memory which retards increment of a read address by an amount corresponding to a time gap between the reception timing of said channel connected to said at least one time gap correcting means and the reception timing of said channel arrived last.

* * * * *